United States Patent
Voigt et al.

(10) Patent No.: US 7,892,430 B2
(45) Date of Patent: Feb. 22, 2011

(54) APPARATUS FOR FILTERING SUBSTANCES OUT OF LIQUIDS

(75) Inventors: Reinhard Voigt, Gotha (DE); Ulrich Meyer-Blumenroth, Idstein-Woersdorf (DE); Jens Lipnizki, Wiesbaden (DE)

(73) Assignee: Microdyn-Nadir GmbH, Wiesbaden (DE)

( * ) Notice: Subject to any disclaimer, the term of this patent is extended or adjusted under 35 U.S.C. 154(b) by 1443 days.

(21) Appl. No.: 11/188,455

(22) Filed: Jul. 25, 2005

(65) Prior Publication Data

US 2006/0086654 A1 Apr. 27, 2006

(30) Foreign Application Priority Data

Oct. 22, 2004 (DE) .................... 10 2004 051 671

(51) Int. Cl.
*B01D 63/00* (2006.01)
*B01D 29/00* (2006.01)

(52) U.S. Cl. .............. 210/323.1; 210/232; 210/321.6; 210/321.75; 210/321.84; 210/340; 210/346; 210/483; 210/488

(58) Field of Classification Search ............. 210/321.6, 210/321.75, 321.84, 323.1, 232, 340, 346, 210/483, 488
See application file for complete search history.

(56) References Cited

U.S. PATENT DOCUMENTS 5,073,262 A * 12/1991 Ahlberg et al. ......... 210/321.68
5,626,752 A 5/1997 Mohn et al. ............ 210/321.75

FOREIGN PATENT DOCUMENTS

| DE | 101 26 311 A1 | 3/2002 |
| EP | 0 129 663 A1 | 1/1985 |
| EP | 0707 884 A1 | 4/1996 |
| EP | 1 147 803 A1 | 10/2001 |
| JP | 62125823 A | 6/1987 |
| JP | 09075965 A | 3/1997 |
| JP | 10180051 A | 7/1998 |
| WO | WO 03/037489 A1 | 5/2003 |
| WO | WO 03/059494 A1 | 7/2003 |
| WO | WO 03/074160 A2 | 9/2003 |

OTHER PUBLICATIONS

English translation European Patent Application No. 0 129 663 A.*

* cited by examiner

*Primary Examiner*—John Kim
(74) *Attorney, Agent, or Firm*—ProPat, L.L.C.

(57) ABSTRACT

Apparatus for filtering liquids, comprising flat membrane pockets arranged parallel and means for pressure-tight connection of the membrane pockets to one another and for coupling an extraction means. The membrane pocket includes a drainage element, which is joined surface-to-surface to two membranes and is enclosed in a pressure-tight manner at the edge. Adjacent membrane pockets are connected to one another and to the extraction means via one or more outflow bores and associated lines. The outflow bores are arranged in such a way that the transmembrane differential pressure drops only slightly over the surface of the membrane pocket.

34 Claims, 12 Drawing Sheets

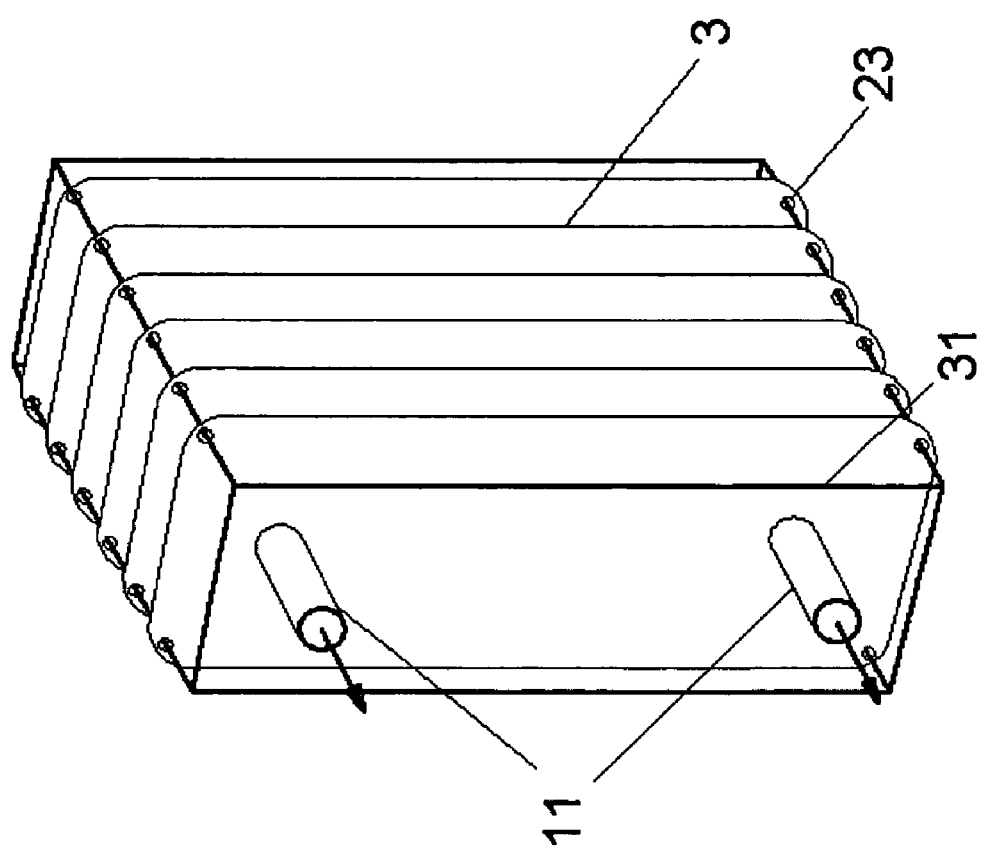

APPARATUS FOR FILTERING SUBSTANCES OUT OF LIQUIDS

CROSS REFERENCE TO RELATED APPLICATIONS

This application claims priority to German parent Application No. 10 2004 051 671.5, filed Oct. 22, 2004, hereby incorporated by reference herein in its entirety.

FIELD OF THE INVENTION

The invention relates to an apparatus for filtering substances out of liquids by micro-, ultra- and nanofiltration, having a number of filter modules comprising filter elements, which are formed as flat membrane cushions and are surrounded by a liquid that is to be filtered, the filter elements being arranged parallel to and at a distance from one another and being connected to one another by outflow bores and connecting elements, and having one permeate outlet per filter module and a permeate collection manifold, to which the permeate outlets of the filter modules are connected.

BACKGROUND OF THE INVENTION

Conventional filter systems for waste water purification comprise a filtration unit with a tubular or box-shaped housing which is open at the top and bottom and in which a plurality of flat filter elements are arranged vertically and parallel to but spaced apart from one another. The spaces between the individual filter elements form passages through which medium can flow. The individual filter elements are configured as cushions or cartridges, in which a flexible drainage layer or rigid filter plate is surrounded on both sides by filtration membranes.

EP 0 707 884 A1 discloses an apparatus for filtering and separating in particular biologically organic flow media by reverse osmosis and micro-, ultra- and nanofiltration, having a pressure-tight housing, having an inlet for the flow medium and outlets for the retentate and the permeate, and a plurality of filter elements, which are accommodated in the housing, are spaced apart from one another, are designed in the form of a membrane cushion and have the flow medium flowing around them, a plurality of separate stacks of membrane cushions being arranged behind or next to one another in the housing, and the flow medium flowing around the stacks in series or in parallel.

EP 0 129 663 A1 discloses a membrane cushion for desalination of water by reverse osmosis, ultrafiltration, hyperfiltration, gas permeation and the like, in which a drainage layer is arranged between two outer membranes and the drainage layer is welded to the membranes continuously and in a pressure-tight manner in an edge zone.

WO 03/037489 A1 describes a filtration module for purifying waste water, having a plurality of filter membrane pockets, which include at least one opening for removing water from their interior and are arranged vertically, parallel to and preferably at an equal distance from one another in a rigid holder, in such a way that a liquid can flow intensively through the spaces between adjacent filter membrane pockets.

The known filter systems include either rigid housings and/or rigid membrane cartridges, which are complex and expensive to produce and assemble, increase the space taken up by the filter module, impede the flow of the liquid that is to be filtered and at which relatively coarse contaminants, such as for example hairs and fibers, tend to accumulate, thereby causing blockages.

When a filter system is operating, particles with a diameter which is too large to pass through the pores in the membrane are retained on the membrane surface and in some cases stick to it. The accumulation of these particles over prolonged periods of time causes the build-up of a filter cake which increasingly blocks the membrane surfaces and reduces the filter capacity of the system. The membrane surfaces are mechanically cleaned at regular intervals, including removal of the filter cake, for example by means of brushes and water jet, as part of plant maintenance. The housing of the known filter systems considerably restricts access to the membrane surfaces and thereby makes cleaning more difficult.

In addition to the mechanical cleaning, there is also the option of flushing the membrane pores clear by back-flushing, i.e. reversal of pressure. In the known areal filter systems, back-flushing is not generally used, since on the one hand it entails the risk of overstretching the filter element and causing cracks in the membrane, which is sensitive to tensile forces, and on the other hand the membranes of adjacent filter elements are pressed onto one another, thereby blocking the back-flow and the removal of the filter cake.

Some of the known filter systems have the additional drawback that the growth of filter cakes is locally accelerated on account of a spatially uneven distribution of the transmembrane differential pressure. The growth rate of the filter cake is directly proportional to the transmembrane volumetric flow and therefore to the transmembrane differential pressure. With regard to the liquid pressure, the known filter systems have three regions, referred to as the filter inlet, the filter element interior and the permeate outlet. In operation, a small pressure difference ($P_v - P_a > 0$) is applied between the filter inlet ($P_v$) and permeate outlet ($P_a$), by means of suction pumps on the outlet side or pressure pumps on the inlet side, so that some of the liquid which is to be filtered flows from the filter inlet through the membrane to the permeate outlet. Under normal operating conditions, the flow velocity and pressure drop in the filter inlet and permeate outlet are low, so that substantially the constant pressures $P_v$ and $P_a$ act on the filter elements and the outflow bores. This does not apply to the filter element interior ($P_i$), in which the permeate flows quickly and moreover the flow velocity increases toward each outflow bore. Accordingly, a position-dependent static pressure $P_i$, where $P_i$ is between $P_a$ and $P_v$ ($P_a \leq P_i \leq P_v$) and decreases toward each outflow bore, acts in the filter element interior. The volume of liquid which flows through the membrane per unit time and area is proportional to the transmembrane differential pressure $P_v - P_i$. Consequently, a filter cake builds up more quickly in regions with a high transmembrane differential pressure, i.e. in the vicinity of an outflow bore, than in regions further away. By way of example, the edge suction disclosed in WO 03/037489 A1 promotes the growth of filter cake at the edge of the filter element, with an associated premature drop in the filter capacity.

SUMMARY OF ADVANTAGEOUS EMBODIMENTS OF THE INVENTION

It is an object of the present invention to provide a filtration apparatus which is simple and inexpensive to produce in design terms, has a low flow resistance and a low susceptibility to becoming blocked and is easy to clean and repair while operation continues.

BRIEF DESCRIPTION OF THE DRAWINGS

FIG. 4b illustrates an alternative embodiment to the perspective view provided in FIG. 4a, with the filter elements secured to a frame by means of bores;

DETAILED DESCRIPTION OF ADVANTAGEOUS EMBODIMENTS OF THE INVENTION

Figure 1:
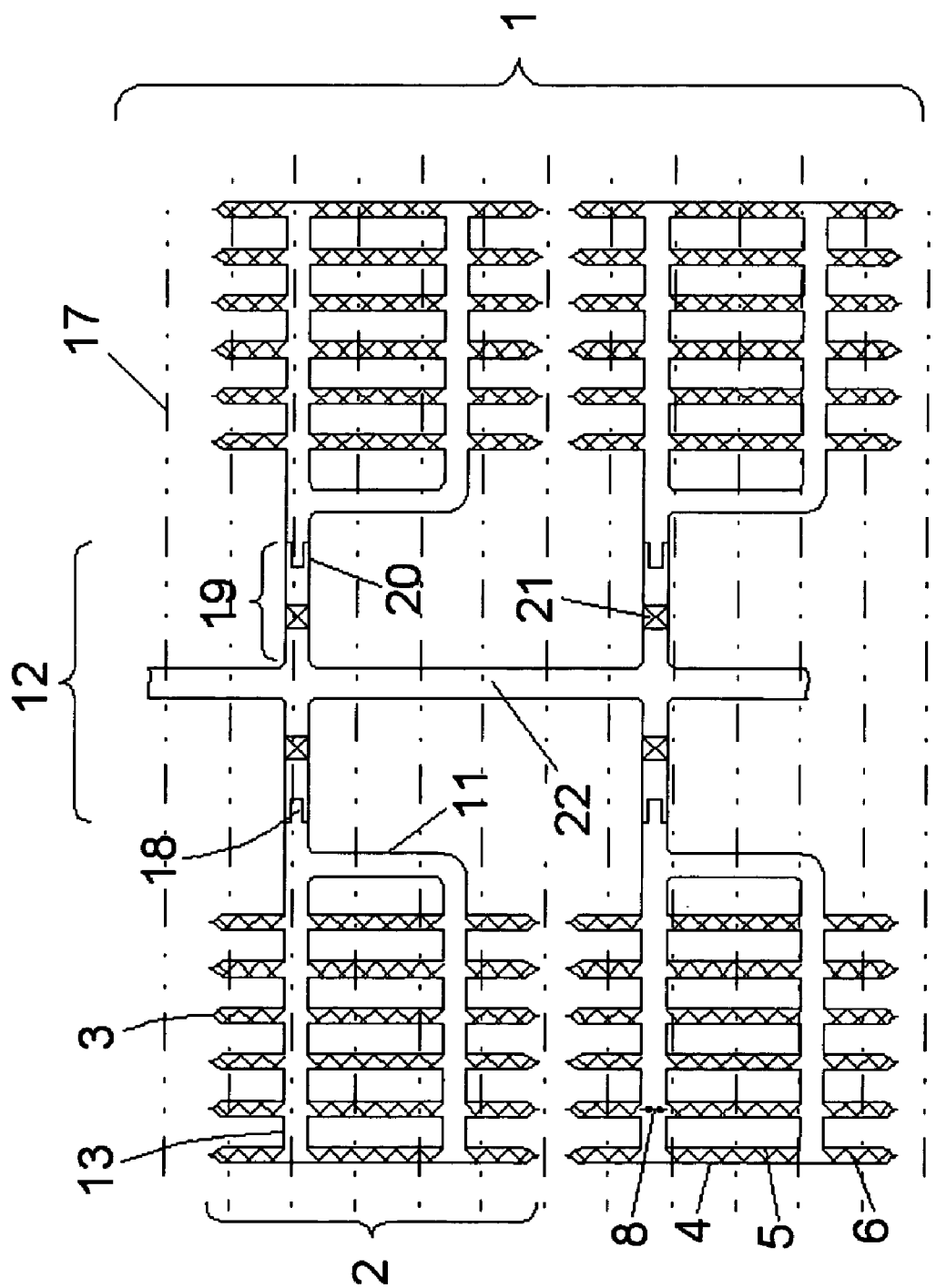
FIG. 1 illustrates a sectional view of an exemplary apparatus with four filter modules, each of which comprises filter elements spaced apart from one another, and a permeate collection manifold.

This object is achieved by the filtration apparatus as claimed in claim 1, wherein according to the invention in each filter element a single-layer or multilayer drainage element is enclosed between two outer membranes and is joined to the membranes on both sides by surface-to-surface adhesion, and wherein the filter element is provided with one or more outflow bores surrounded by equally sized surface regions of the filter element, each outflow bore being arranged in the center of the surface region surrounding it.

The surface-to-surface joining between the drainage element and the outer membranes on both sides prevents the filter elements from swelling up, which means that they are not damaged and do not block adjacent membranes during cleaning by means of back-flushing. The arrangement of the outflow bores in accordance with the invention keeps the transmembrane differential pressure relatively constant over the filter element, with an associated uniform filter cake growth and economical utilization of the filter. This effect can also be boosted by a drainage element, the flow resistance of which becomes lower at decreasing distance from the outflow bores. By way of example, the flow resistance of the drainage element can be reduced by means of its thickness or by means of the number of drainage layers.

To filter slow-flowing liquids, the apparatus according to the invention may preferably be configured as a self-supporting structure. The elimination of housings, frames or other additional supporting elements minimizes the flow resistance and the surfaces or structures at which coarse contaminants in the liquid that is to be filtered, such as for example hairs and fibers, tend to become trapped. To filter liquids flowing quickly and turbulently, it is advantageous for the filter elements to be secured in a frame, in which case the frame preferably has a low flow resistance.

Moreover, the open design of the filter system according to the invention is beneficial to the mechanical cleaning of the membrane surfaces, since it enables cleaning equipment or a water jet to be introduced into the gap between adjacent filter elements substantially from all sides. Suitable cleaning equipment includes, for example, round or flat brushes, the size of which in one dimension is less than or equal to the gap between adjacent filter elements.

It is expedient for the apparatus to be substantially modular in form, made up of a large number of structurally identical components. The advantages of a continuous modular design for production, stock-keeping, assembly and installation are well known. Moreover, filter elements in the form of flexible membrane pockets can be produced at relatively low cost in a quasi-continuous process from web materials.

One advantageous configuration of the invention consists in the fact that the permeate outlet of each filter module is connected by means of a releasable coupling to in each case one connection line of the permeate collection manifold, each connection line being equipped with a valve. If the valve of a connection line is closed, the associated filter module can be decoupled and removed while operation continues without unfiltered liquid passing into the permeate collection manifold. It is therefore possible for a defective filter module to be removed for exchange or repair and replaced by a fully functioning filter module while operation continues.

The membranes of the filter apparatus according to the invention preferably consist of polyether sulfone, polysulfone, polyacrylonitrile, polyvinylidene fluoride, polyamide, polyetherimide, cellulose acetate, regenerated cellulose, polyolefins, fluorinated polymers, and can be produced, for example, by coating nonwoven fabrics or woven fabrics with polymer solution and producing the pores in a subsequent phase inversion step or by stretching polymer films in a suitable way so as to form the desired pores. Many of these membranes are commercially available, for example under the tradename NADIR® membranes (NADIR Filtration GmbH, Wiesbaden) or Celgard® flat sheet membranes (Celgard Inc., Charlotte, N.C., USA).

The drainage element expediently comprises one or more woven fabrics made up of yarns, filaments, threads or wires of polymers or metals, one or more nonwoven fabrics of polymers, or a combination of these nonwoven and woven fabrics.

The membranes may be joined to the drainage element over the entire surface, in punctiform or linear fashion, by the application of a reactive or hotmelt adhesive. Thermal welding and ultrasonic welding are other suitable processes for producing a join of this type. At the edges of the filter element, the drainage element is sealed in a pressure-tight manner to the membranes, in order to prevent the penetration of a contaminated medium.

Figure 2:
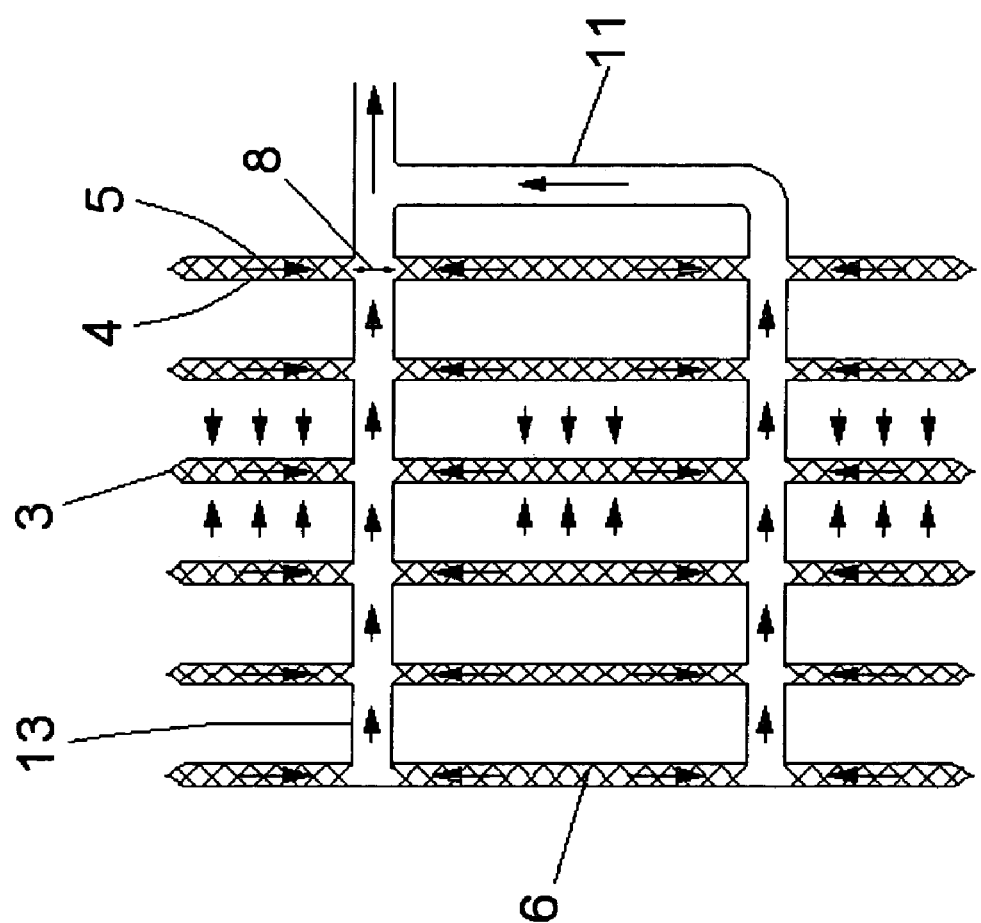
FIG. 2 illustrates a sectional view through an exemplary filter module with filter elements, connecting elements and permeate outlet.
Figure 3:
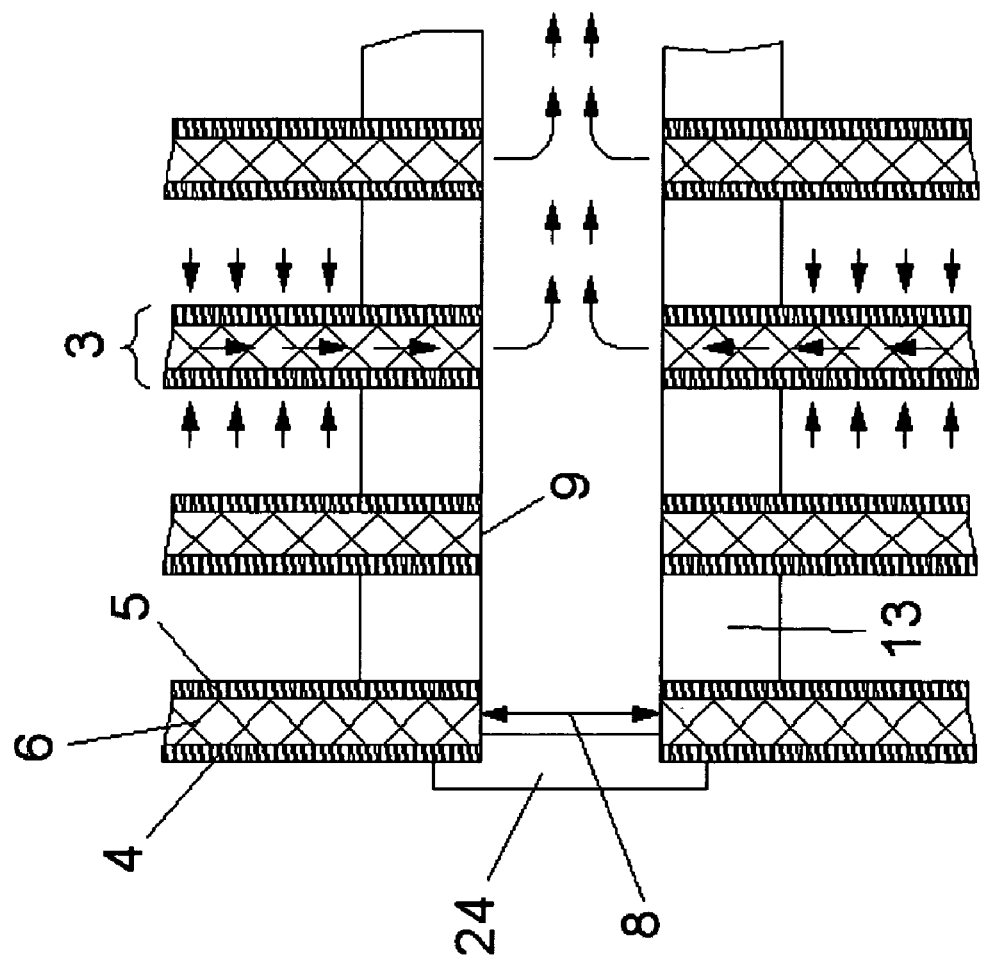
FIG. 3 illustrates an enlarged partial view of the sectional view of FIG. 2.
Figure 4A:
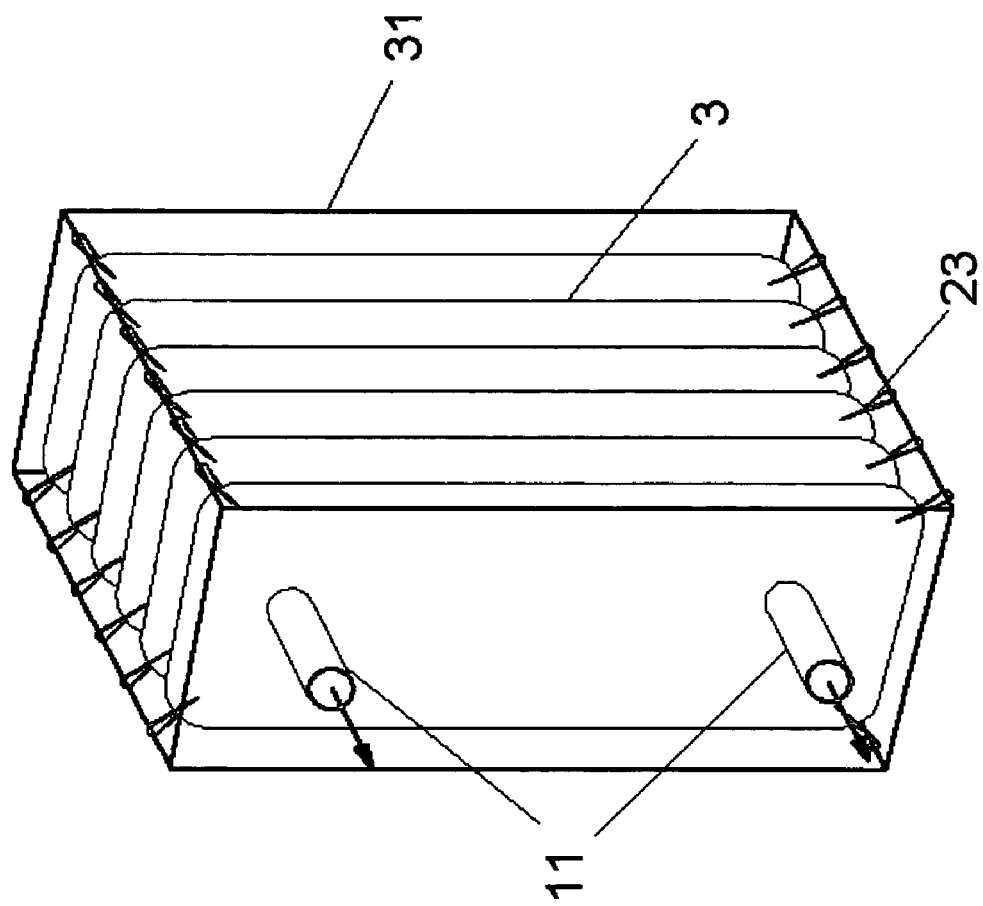
FIG. 4a illustrates a perspective view of an exemplary filter module made up of filter elements, which are secured to a frame by means of loops, and parts of the permeate outlet.
Figure 5:
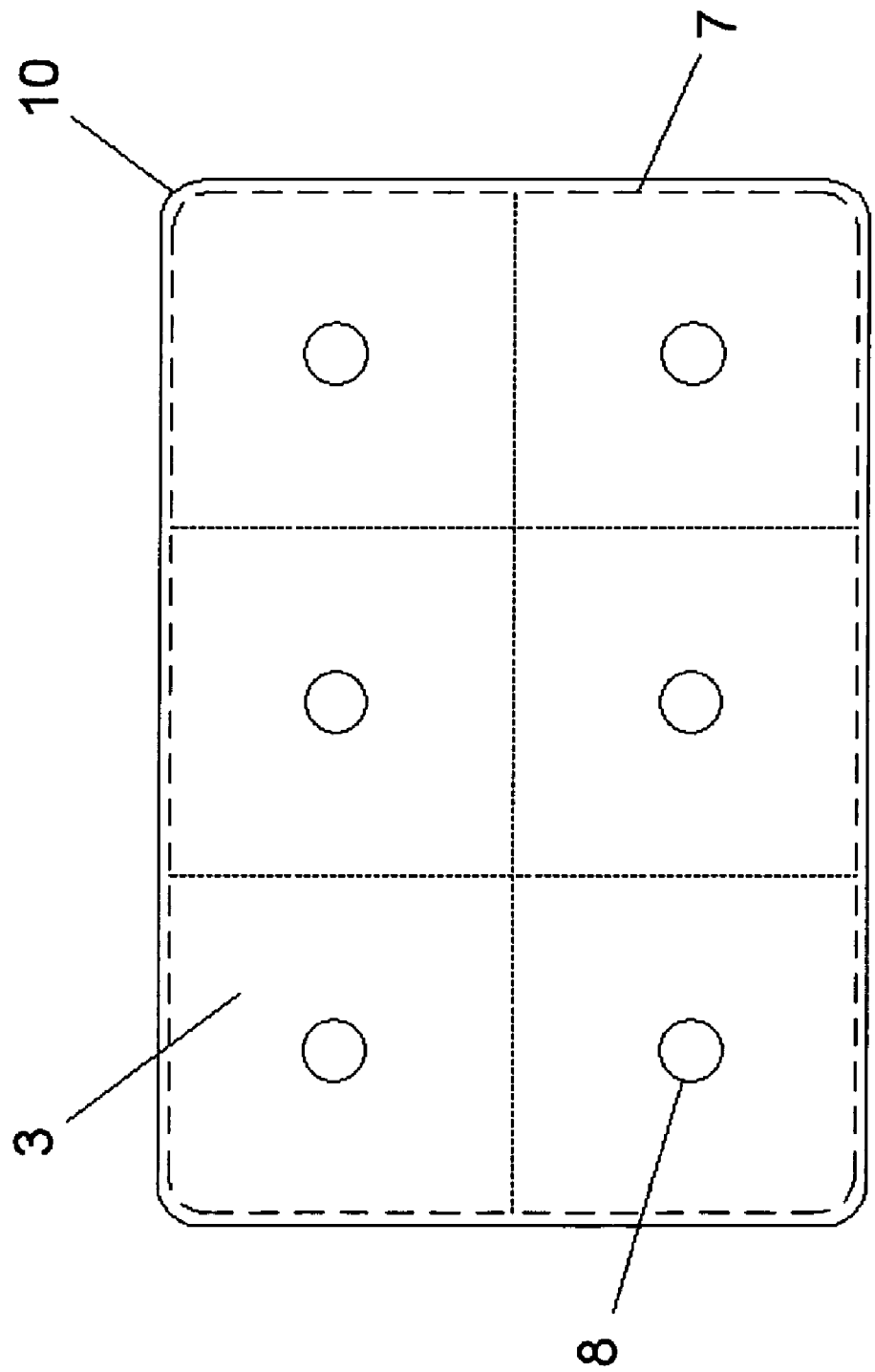
FIG. 5 illustrates a plan view of an exemplary filter element with six outflow bores and edge region.
Figure 6A:
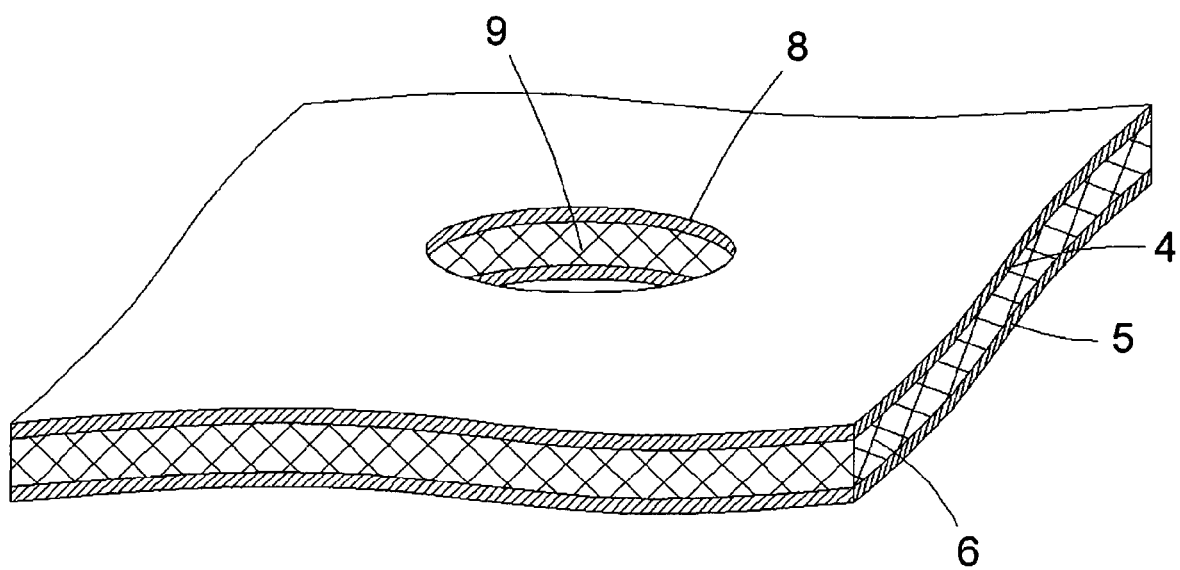
FIG. 6a illustrates a perspective partial view of an exemplary filter element with outflow bore, two outer membranes and a drainage layer.
Figure 6B:
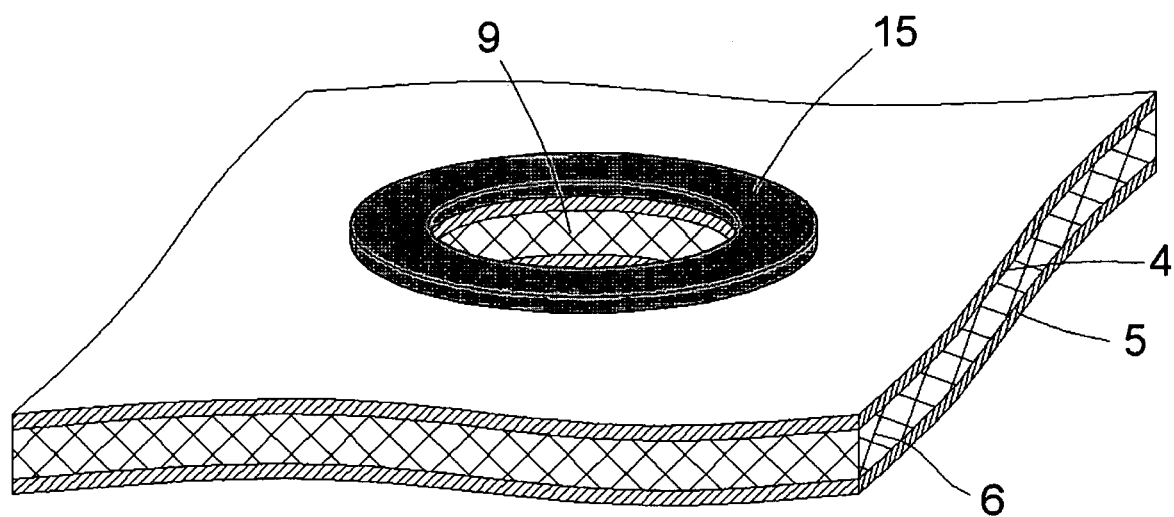
FIG. 6b illustrates a perspective partial view of an additional aspect of the exemplary filter element shown in FIG. 6a that includes a further supporting element.
Figure 7:
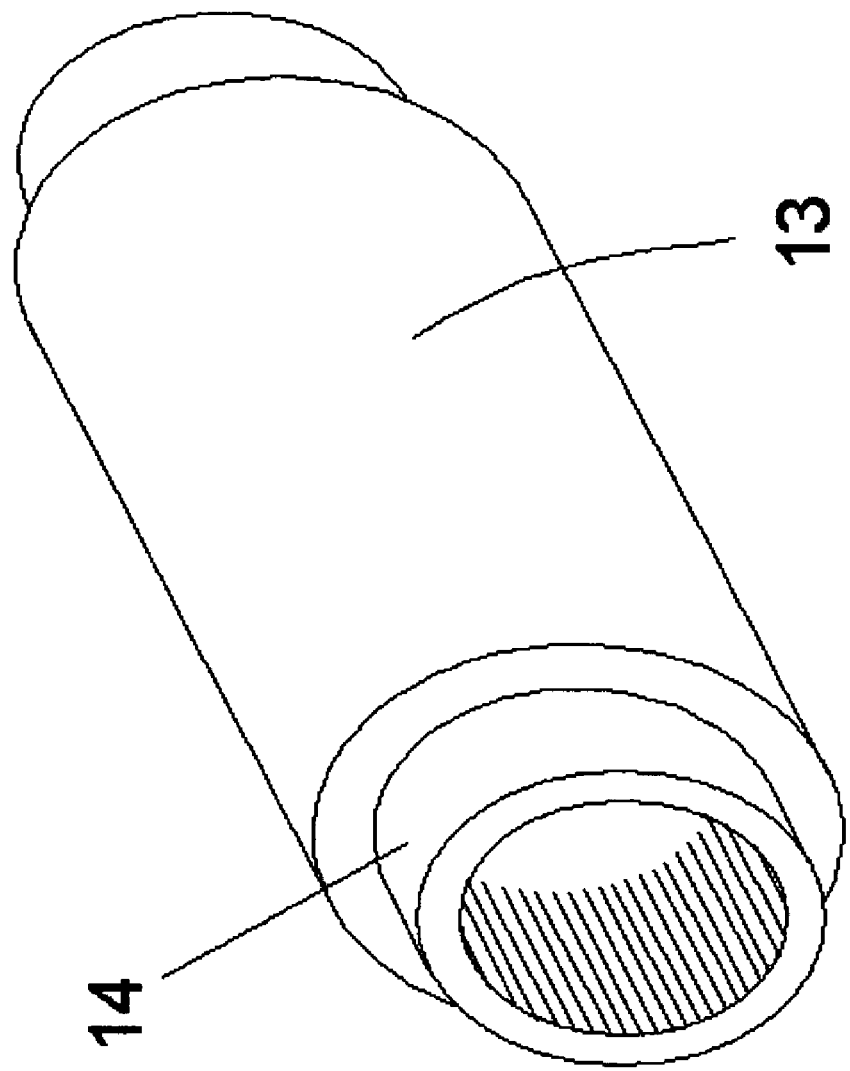
FIG. 7 illustrates a perspective view of an exemplary connecting element.
Figure 8A:
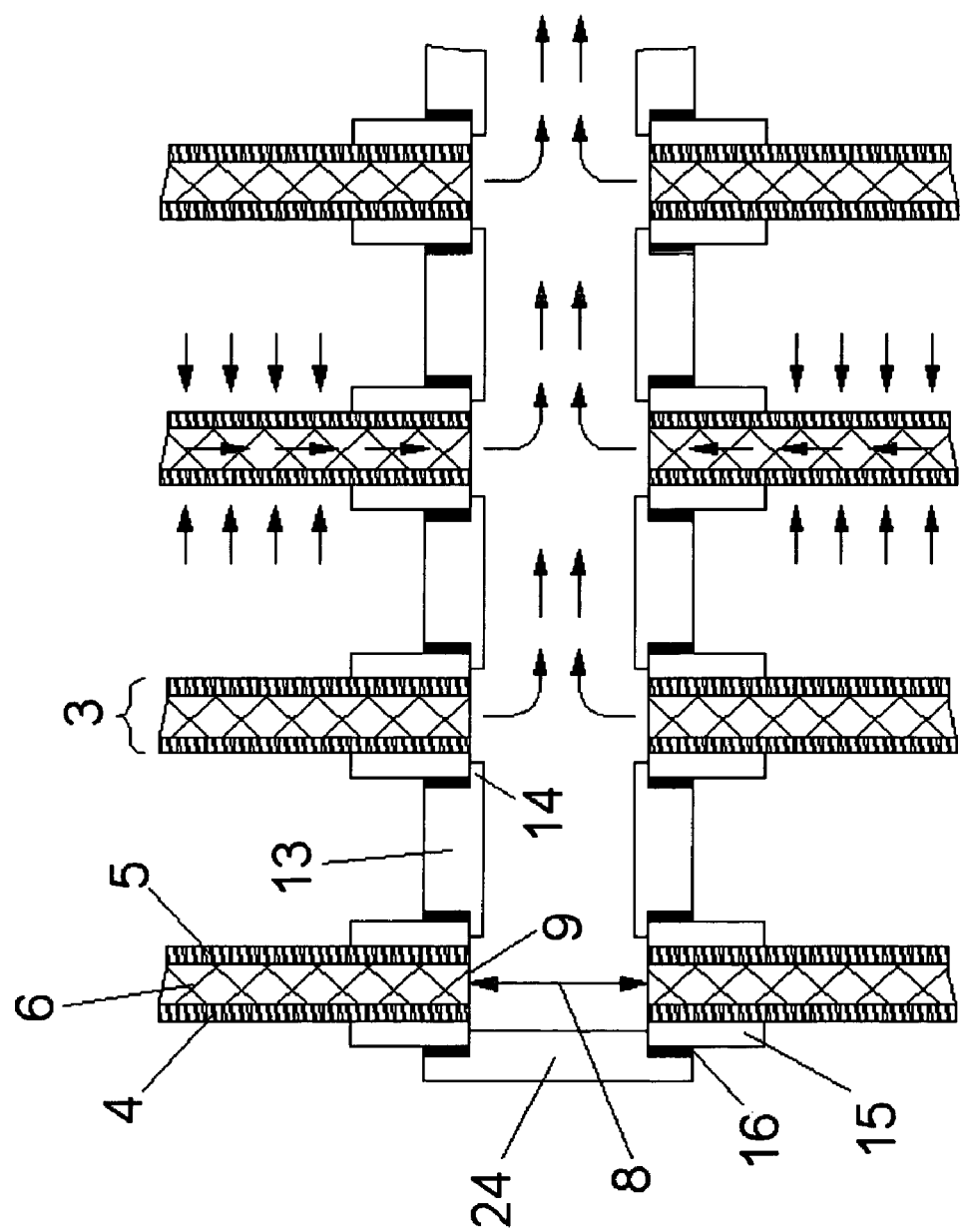
FIG. 8a illustrates a sectional partial view of an exemplary filter module comprising filter elements with outer membranes, drainage elements, supporting elements, sealing means and connecting elements.
Figure 8B:
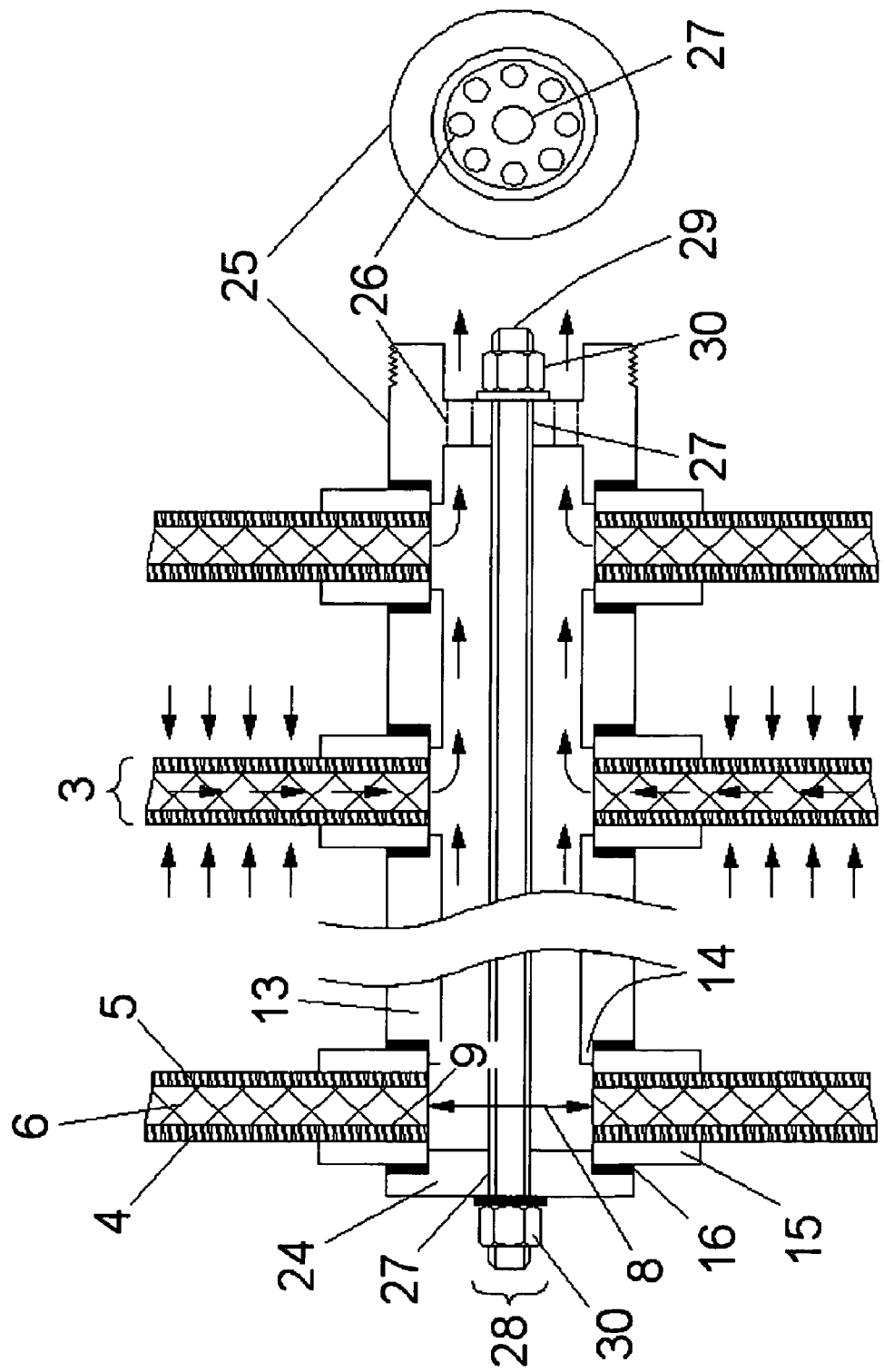
FIG. 8b illustrates a sectional partial view of an additional aspect of the exemplary filter module in FIG. 8a that includes an additional mounting means.

The invention is described in detail below on the basis of exemplary embodiments and with reference to the diagrammatic drawings, in which:

FIG. 1 shows a sectional view through an apparatus with four filter modules, each of which comprises filter elements spaced apart from one another, and a permeate collection manifold;

FIG. 2 shows a sectional view through a filter module with filter elements, connecting elements and permeate outlet;

FIG. 3 shows an enlarged partial view of FIG. 2;

FIG. 4a shows a perspective view of a filter module made up of filter elements, which are secured to a frame by means of loops, and parts of the permeate outlet;

FIG. 4b shows the view shown in FIG. 4a, with the filter elements secured to a frame by means of bores;

FIG. 5 shows a plan view of a filter element with six outflow bores and edge region;

FIG. 6a shows a perspective partial view of a filter element with outflow bore, two outer membranes and a drainage layer;

FIG. 6b shows the view shown in FIG. 6a with a supporting element;

FIG. 7 shows a perspective view of a connecting element;

FIG. 8a shows a sectional partial view of a filter module comprising filter elements with outer membranes, drainage elements, supporting elements, sealing means and connecting elements;

FIG. 8b shows the view shown in FIG. 8a with an additional mounting means; and

Figure 9:
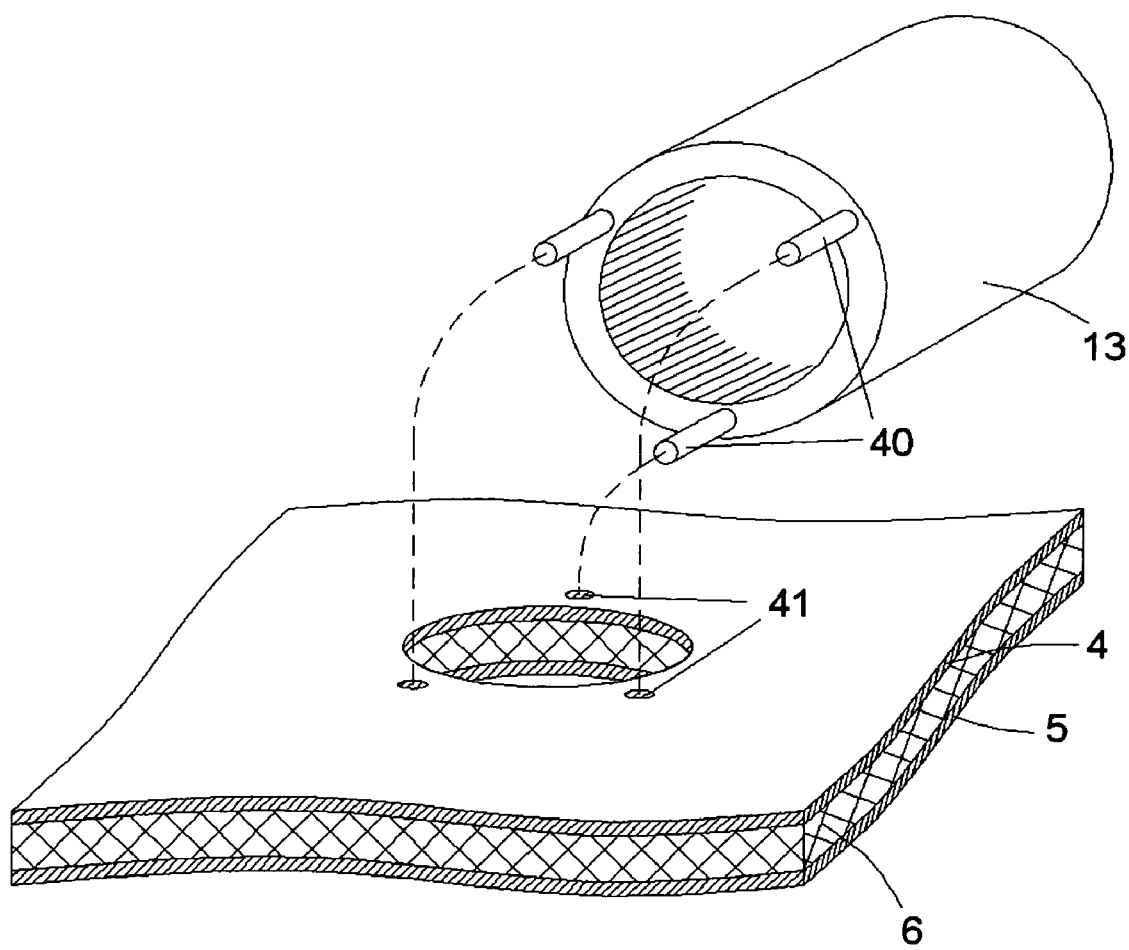
FIG. 9 illustrates a perspective view of a connecting element with spacer pieces.

FIG. 9 shows a connecting element with spacer pieces.

As can be seen from FIG. 1, the apparatus 1 comprises a number of filter modules 2 with filter elements 3, which are designed as flat membrane pockets, with a liquid 17 that is to be filtered surrounding or flowing around them. The filter elements 3 are arranged parallel to and spaced apart from another and are connected to one another in a pressure-tight manner by means of connecting elements 13, the connecting elements 13 being connected to outflow bores 8 in the filter elements 3. One permeate outlet 11 per filter module 2 is connected to a permeate collection manifold 12 by means of a coupling 18. The permeate collection manifold 12 comprises a main line 22, from which connection lines 19 branch off. The connection line 19 is equipped with a coupling-receiving part 20 and a valve 21. In the coupled-together state, the coupling 18 and the coupling-receiving part 20 form a pressure-tight connection between the permeate outlet 11 and the permeate collection manifold 12.

The flow of permeate through the membranes 4 and 5 and the drainage element 6 into the connecting elements 13 and the permeate outlet 11 is indicated by arrows in FIGS. 2 and 3. Furthermore, FIG. 3 shows an outflow gap 9 and a cover 24, by which each outflow bore 8 is closed off in a pressure-tight manner on the outer side of the first filter element 3 of the filter module 2. In a simple embodiment of the invention, the connecting elements 13 and the cover 24 are adhesively bonded directly to the filter elements 3.

In the example shown in FIG. 4a, the filter elements 3 are suspended in a frame 31 by means of securing means 23 configured as loops. This form of attachment ensures that the flexible filter elements 3 remain arranged parallel to and at a distance from one another even in very turbulent liquid flows. FIG. 4b shows an alternative form of attachment by means of bores. To keep the flow resistance of the frame 31 at a low level, it is advantageous for the frame to be constructed from metal profiled sections with a small cross section. In one preferred embodiment, the frame 31 is mounted in a spatially fixed position, e.g. on the wall of a settling tank, and is used both to mount the filter element 3 and to secure the permeate collection manifold 12 and the permeate outlets 11. In this preferred embodiment, the permeate collection manifold 12 and the permeate outlets 11 are connected to the frame 31 by means of struts (not shown in the figures).

FIG. 5 shows a plan view of a filter element 3 with rounded corners 10. By way of example, six circular outflow bores 8 are illustrated, each outflow bore 8 being located in the center of an equally sized surface region of the filter element 3. In the illustration presented in FIG. 5, the surface regions are indicated by dotted lines, each surface region corresponding to ⅙ of the surface area of the filter element 3. The dimensions of the filter element 3 and the number and position of outflow bores 8 are selected in such a way that the surface regions which surround the outflow bores 8 correspond to an integer-number fraction of the surface area of the filter element 3. Square surface regions have proven particularly favorable for uniform distribution of the transmembrane differential-pressure over the membrane surface. In one preferred embodiment of the invention, the ratio between length L and width B of the filter element 3 is such that there exists a common divisor T, i.e. L/m=B/n=T, where m, n are integer numbers. Accordingly, the surface of the filter element comprises m×n square surface regions of size $T^2$, each surface region being provided with a centrally mounted outflow bore 8.

The filter element 3 is sealed in a pressure-tight manner in the edge region 7, which is demarcated by a dashed line and the boundary in FIG. 5. The pressure-tight sealing is executed in the form of a weld produced thermally or using ultrasound or in the form of an adhesively bonded, threaded or joined seam, either with the outer membranes 4 and 5 joined to the drainage element 6 or with the outer membranes 4 and 5 directly joined to one another. For direct sealing of the membranes 4 and 5 to one another, it is expedient for the drainage element 6 to be made slightly smaller than the membranes 4 and 5.

In one preferred configuration of the adhesively bonded seam, the outer membranes 4 and 5 are sealed to the drainage element 6 by virtue of the edges or borders of the filter element being immersed in a melt or solution, the melt or solution substantially comprising the polymer starting material of the filter membrane.

FIGS. 6a and 6b show perspective views of an outflow bore 8 without and with the supporting element 15, which is in this case configured as an annular disk. An outflow gap 9, through which the permeate passes from the filter element interior into the connecting element 13 and the permeate discharge 11, is formed from the cut area of the outflow bore 8 through the drainage element 6. With the drainage element 6 according to the invention, in particular if it is in the form of a polymeric woven or nonwoven fabric, the outflow gap 9 can be narrowed or even closed up altogether by even a small, locally acting force perpendicular to the surface of the membrane 4. A disadvantageous effect of this nature is avoided, according to the invention, by the supporting element 15, which distributes forces acting locally on the outflow gap perpendicular to the membrane 4 over a larger area.

FIG. 7 shows a perspective view of a preferred embodiment of the connecting element 13, in which the connecting element 13 is configured as a tube and is provided with a cylindrical extension 14.

The partial view of a filter module 2 illustrated in section in FIG. 8a shows the function of the extension 14 as a means for spatial orientation and fixing of the connecting elements 13 between two outflow bores 8 lying opposite one another in adjacent filter elements 3. The external diameter of the cylindrical extension 14 is such that it can be fitted in a positively locking manner to the supporting element 15. In one preferred embodiment of the invention, a sealing means 16, which is configured as an annular disk made from rubber, is inserted between supporting element 15 and connecting element 13. The dimensions of the extension 14 are such that its length is greater than the thickness of the sealing means 16 and less than or equal to the total thickness of sealing means 16 and supporting element 15. This results in mechanically stable, pressure-tight holding of the connecting element 13. The outflow bore 8 in the first filter element 3 in the filter module 2 is closed off in a pressure-tight manner on its outer side by a cover 24. FIG. 7 also illustrates the flow of the liquid that is to be filtered or the permeate from the inlet through the membranes 4 and 5, the drainage element 6 and the connecting element 13 into the permeate outlet 11.

An additional mounting means 28 of the exemplary embodiment shown in FIG. 8b comprises a rod 29 and two nuts 30, the rod 29 being provided with a screw thread at both ends. The rod 29 is guided through central bores 27 in a cover 24 and a fitting element 25 and is fixed in place by means of the nuts 30. The fitting element 25 has a plurality of passages 26 through which the permeate flows into the permeate outlet 11.

One preferred embodiment of the connecting element 13 is illustrated in FIG. 9. In this case, the connecting element 13 is a tube which is equipped with at least three spacer pieces 40 on one end face. The length of the spacer pieces 40 is between 90 and 100% of the thickness of the filter element 3. For the spacer pieces 40 to be received in a tightly fitting manner, the filter element 3 is equipped with spacer bores 41, the spacer bores 41 being arranged centrally around the outflow bores 8. It is expedient for the cover 24 likewise to be equipped with spacer pieces 40. Both during mounting of the filter modules 2 and in subsequent operation, the spacer pieces 40 limit the compression of the elastic filter elements 3, with the result that mechanical damage and the partial or complete blocking of the permeate flow are avoided. In particular, the spacer pieces 40 are suitable for a simple embodiment of the invention in which the connecting elements 13, the cover 24 and the fitting element 25 are directly adhesively bonded to the filter elements 3.

A further embodiment of the invention (not illustrated in the drawing) relates to the mounting means 28, which is equipped with a spacer in order to limit the compression of the filter elements 3. In particular, the spacer is a cladding tube for the rod 29 to pass through, the length of the cladding tube being such that the compression of the filter elements 3 is less than 10% when the cladding tube is clamped in a nonpositively locking manner between the cover 24 and the fitting element 25. In an alternative configuration, which is likewise in accordance with the invention, the spacer comprises the rod 29 and a first and second locking nut. The first and second locking nuts are positioned on the screw threads of the rod 29, in such a way that they form a stop for the cover 24 and for the fitting element 25, the distance between the first and second locking nuts being such that the compression of the filter elements 3 is less than 10%.

The invention claimed is:

1. An apparatus for filtering substances out of liquids by micro-, ultra- and nanofiltration, said apparatus comprising a number of filter nodules comprising filter elements, which are formed as flat membrane cushions and are surrounded by a liquid that is to be filtered, the filter elements being arranged parallel to and at a distance from one another and being connected to one another by outflow bores and connecting elements, and having one permeate outlet per filter module and a permeate collection manifold, to which the permeate outlets of the filter modules are connected, wherein in each filter element a single-layer or multilayer drainage element is enclosed between two outer membranes and is joined to the membranes on both sides by surface-to-surface adhesion, and wherein the filter element is provided with one or more outflow bores surrounded by equally sized surface regions of the filter element, each outflow bore being arranged in the center of the surface region surrounding it, and each outflow bore equipped with a supporting element, and the drainage element comprises one or more woven fabrics made up of yarns, filaments, threads or wires of polymers or metals, one or more nonwoven fabrics of polymers, or a combination of these woven and nonwoven fabrics, adjacent filter elements are connected to one another in a pressure-tight manner by means of tubular connecting elements, each connecting element being connected to two outflow bores located opposite one another in the adjacent filter elements and the tubular connecting element has a cylindrical extension on both end sides.

2. The apparatus as claimed in claim 1, wherein the length and width of the filter element are in an integer-number ratio, and wherein each outflow bore is arranged in the center of an equally sized square region of the surface of the filter element.

3. The apparatus as claimed in claim 1, wherein the filter elements are flexible.

4. The apparatus as claimed in claim 1, wherein the drainage element has a flow resistance which varies over the surface of the filter element, the flow resistance decreasing continuously or in steps at decreasing distance from the outflow bores.

5. The apparatus as claimed in claim 1, wherein the filter elements have an edge region, in which the outer membranes and the drainage element form a pressure-tight assembly.

6. The apparatus as claimed in claim 1, wherein the filter elements have an edge region in which the outer membranes are joined to one another in a pressure-tight manner.

7. The apparatus as claimed in claim 1, wherein the filter elements have rounded corners.

8. The apparatus as claimed in claim 1, wherein the filter elements are equipped with securing means.

9. The apparatus as claimed in claim 8, wherein the securing means are configured as loops attached to an edge region on the filter elements.

10. The apparatus as claimed in claim 8, wherein the securing means are configured as pressure-tight bores.

11. The apparatus as claimed in claim 1, wherein the filter module is equipped with a frame and wherein the securing means are arranged on the frame.

12. The apparatus as claimed in claim 11, wherein the frame is spatially fixed and wherein the permeate collection manifold and the permeate outlet are mounted on the frame.

13. The apparatus as claimed in claim 1, wherein each outflow bore on the two outer sides of the filter element is equipped with one supporting element made from a polymer or a metal.

14. The apparatus as claimed in claim 1, wherein the connecting element consists of a polymer or metal.

15. The apparatus as claimed in claim 1, wherein the outflow bore is closed off in a pressure-tight manner by means of a cover on the outer side of the first filter element of the filter module.

16. The apparatus as claimed in claim 1, wherein the outflow bore is connected in a pressure-tight manner to the permeate outlet on the outer side of the last filter element of the filter module.

17. The apparatus as claimed in claim 1, wherein the outflow bore is connected in a pressure-tight manner to the permeate outlet by means of a fitting element on the outer side of the last filter element of the filter module.

18. The apparatus as claimed in claim 15, wherein the cover and a fitting element are mechanically coupled to one another via a mounting means, the mounting means exerting a tensile stress perpendicular to the surface of the filter elements between the cover and the fitting element.

19. The apparatus as claimed in claim 18, wherein the mounting means comprises a rod and two nuts made from metal or plastic, wherein the rod, at both ends, has screw threads for the nuts, wherein the cover and the fitting element are each provided with a central bore for the rod to pass through in a positively locking manner, and wherein the fitting element has a plurality of passages for transferring the permeate into the permeate outlet.

20. The apparatus as claimed in claim 1, wherein a sealing means made from an elastomeric material is arranged between the filter elements and the connecting elements, between the first filter element and a cover and between the last filter element and the permeate outlet or the fitting elements.

21. The apparatus as claimed in claim 1, wherein the outflow bore is circular.

22. The apparatus as claimed in claim 13, wherein the supporting element is an annular disk.

23. The apparatus as claimed in claim 20, wherein the sealing means is an annular disk.

24. The apparatus as claimed in claim 1, wherein the external diameter of the extension is such that the extension is inserted in a positively locking manner into an annular supporting element, wherein the internal diameter of the extension is equal to the internal diameter of the connecting element, and wherein the length of the extension is greater than the thickness of a sealing means and less than or equal to the total thickness of supporting element and sealing means.

25. The apparatus as claimed in claim 1, wherein the permeate outlet is equipped with a coupling.

26. The apparatus as claimed in claim 1, wherein the permeate collection manifold is composed of a main line and connection lines for the filter modules.

27. An apparatus for filtering substances out of liquids by micro-, ultra- and nanofiltration, said apparatus comprising a number of filter modules comprising filter elements, which are formed as flat membrane cushions and are surrounded by a liquid that is to be filtered, the filter elements being arranged parallel to and at a distance from one another and being connected to one another by outflow bores and connecting elements, and having one permeate outlet per filter module and a permeate collection manifold, to which the permeate outlets of the filter modules are connected,
wherein in each filter element a single-layer or multilayer drainage element is enclosed between two outer membranes and said drainage element is joined to the membranes on both sides by surface-to-surface adhesion, and wherein the filter element is provided with one or more outflow bores surrounded by equally sized surface regions of the filter element, each outflow bore being arranged in the center of the surface region surrounding it and,
the permeate collection manifold is composed of a main line and connection lines for the filter modules and each connection line is equipped with a valve and a coupling-receiving part for receiving a coupling.

28. An apparatus for filtering substances out of liquids by micro-, ultra- and nanofiltration, said apparatus comprising a number of filter modules comprising filter elements, which are formed as flat membrane cushions and are surrounded by a liquid that is to be filtered, the filter elements being arranged parallel to and at a distance from one another and being connected to one another by outflow bores and connecting elements, and having one permeate outlet per filter module and a permeate collection manifold, to which the permeate outlets of the filter modules are connected,
wherein in each filter element a single-layer or multi layer drainage element is enclosed between two outer membranes and is joined to the membranes on both sides by surface-to-surface adhesion, and wherein the filter element is provided with one or more outflow bores surrounded by equally sized surface regions of the filter element, each outflow bore being arranged in the center of the surface region surrounding it,
and the drainage element comprises one or more woven fabrics made up of yarns, filaments, threads or wires of polymers or metals, one or more nonwoven fabrics of polymers, or a combination of these woven and nonwoven fabrics,
wherein the connecting element is a tube which on an end face has three or more spacer pieces arranged equidistantly with respect to one another, wherein the length of the spacer pieces amounts to between 90 and 100% of the thickness of the filter elements, and wherein three or more spacer bores for receiving the spacer pieces in a tightly fitting manner are arranged around all the outflow bores of each filter element.

29. The apparatus as claimed in claim 28, wherein a cover is equipped with three or more spacer pieces.

30. The apparatus as claimed in claim 19, wherein the mounting means is equipped with a spacer for limiting the compression of the filter elements.

31. The apparatus as claimed in claim 30, wherein the spacer is a cladding tube for the rod to pass through, the length of the cladding tube being such that the compression of the filter elements is less than 10% when the cladding tube is clamped in a nonpositively locking manner between the cover and the fitting element.

32. The apparatus as claimed in claim 30, wherein the spacer includes the rod and a first and second locking nut, wherein the first and second locking nuts are positioned on the screw threads of the rod, and wherein the first locking nut forms a stop for the cover and the second locking nut forms a stop for the fitting element, the distance between the first and second locking nuts being such that the compression of the filter elements is less than 10%.

33. An apparatus as claimed in claim 1, wherein the drainage element consists of one or more woven fabrics made up of polymers, one or more nonwoven fabrics of polymers, or a combination of these woven and nonwoven polymeric fabrics.

34. An apparatus as claimed in claim 1, wherein the filter element has a length, L and a width, B, and a common divisor, T, such that L/m=B/n=T, where m and n are integer numbers, and the surface of the filter element comprises m×n square surface regions, each surface region being provided with a centrally mounted outflow bore.

* * * * *